(12) United States Patent
Lin

(10) Patent No.: US 12,338,832 B2
(45) Date of Patent: Jun. 24, 2025

(54) CEILING FAN

(71) Applicant: Kuo-Tsun Lin, Taichung (TW)

(72) Inventor: Kuo-Tsun Lin, Taichung (TW)

( * ) Notice: Subject to any disclaimer, the term of this patent is extended or adjusted under 35 U.S.C. 154(b) by 227 days.

(21) Appl. No.: 18/305,203

(22) Filed: Apr. 21, 2023

(65) Prior Publication Data

US 2023/0340963 A1 Oct. 26, 2023

(30) Foreign Application Priority Data

Apr. 25, 2022 (TW) .................................. 111115661

(51) Int. Cl.
  *F04D 27/00* (2006.01)
  *F04D 25/06* (2006.01)
  *F04D 25/08* (2006.01)
  *G01S 17/08* (2006.01)
  *G01S 17/58* (2006.01)
  *G01S 17/88* (2006.01)
  *G08B 21/18* (2006.01)

(52) U.S. Cl.
  CPC ........... *F04D 27/008* (2013.01); *F04D 25/06* (2013.01); *F04D 27/004* (2013.01); *G01S 17/08* (2013.01); *G01S 17/58* (2013.01); *G01S 17/88* (2013.01); *G08B 21/182* (2013.01); *F04D 25/088* (2013.01)

(58) Field of Classification Search
  CPC ...... F04D 27/008; F04D 25/06; F04D 27/004; F04D 25/088; G01S 17/08; G01S 17/58; G01S 17/88; G08B 21/182
  See application file for complete search history.

(56) References Cited

U.S. PATENT DOCUMENTS

2005/0141997 A1* 6/2005 Rast .................. F41A 19/03
                                                          416/229 R

FOREIGN PATENT DOCUMENTS

| CN | 106050721 A | * | 10/2016 | ........... F04D 27/008 |
| CN | 206608340 U |   | 11/2017 | |
| CN | 111472989 A | * | 7/2020  | |
| TW | 201344054 A |   | 11/2013 | |

OTHER PUBLICATIONS

CN106050721A translation (Year: 2025).*
CN111472989A translation (Year: 2025).*

* cited by examiner

*Primary Examiner* — David N Brandt
(74) *Attorney, Agent, or Firm* — Birch, Stewart, Kolasch & Birch, LLP

(57) ABSTRACT

A ceiling fan includes a carrier unit, a motor, a fan body, a light sensing unit, and a control unit. The light sensing unit emits a light signal, receives the light signal, and outputs a sensing signal related to a round trip time of the light signal. The control unit performs a safety procedure of: calculating a distance and a moving speed of an object relative to the ceiling fan based on the sensing signal; controlling the motor to rotate the fan body at a predetermined rotational speed when the moving speed is greater than a speed threshold or when the distance is between a first distance threshold and a second distance threshold; and controlling the motor to stop rotating the fan body when the distance is smaller than the second distance threshold.

9 Claims, 4 Drawing Sheets

CEILING FAN

CROSS-REFERENCE TO RELATED APPLICATION

This application claims priority to Taiwanese Invention Patent Application No. 111115661, filed on Apr. 25, 2022.

FIELD

The disclosure relates to a ceiling fan, and more particularly to a ceiling fan with protective functions.

BACKGROUND

A conventional protective device for a ceiling fan disclosed in Chinese Patent Application Publication No. CN106050721A is configured to be mounted on the ceiling fan. During operation of the ceiling fan, when a horizontal or a vertical angle of the ceiling fan is greater than a threshold, the conventional protective device for the ceiling fan is configured to control a buzzer to generate an alarm and turn off the ceiling fan.

The conventional protective device for the ceiling fan may only provide protection to the ceiling fan by monitoring the horizontal angle and the vertical angle of the ceiling fan, but is unable to provide protection when an object approaches the ceiling fan.

SUMMARY

Therefore, an object of the disclosure is to provide a ceiling fan that can alleviate at least one of the drawbacks of the prior art.

According to the disclosure, a ceiling fan that is adapted to be hung from an installation surface is provided. The ceiling fan includes a carrier unit, a motor, a fan body, a light sensing unit, and a control unit. The carrier unit is configured to be connected to the installation surface. The motor is mounted to the carrier unit. The fan body is disposed to be driven by the motor to rotate relative to the carrier unit. The light sensing unit is mounted to the carrier unit, and is configured to emit a light signal, to receive the light signal reflected by an object, and to output a first signal that is related to a round trip time of the light signal. The control unit is electrically connected to the motor and the light sensing unit, and is configured to perform a safety procedure when the fan body is rotating at a user-defined rotational speed, wherein the control unit is configured to, in the safety procedure: calculate, using a time-of-flight principle, a distance between the object and the ceiling fan based on the first signal outputted by the light sensing unit, and an object speed of the object relative to the ceiling fan based on change in the distance over time; control the motor to rotate the fan body at a predetermined rotational speed that is smaller than the user-defined rotational speed when the object speed is greater than a speed threshold; control the motor to rotate the fan body at the predetermined rotational speed when the distance is between a first distance threshold and a second distance threshold that is smaller than the first distance threshold; and control the motor to stop rotating the fan body when the distance is smaller than the second distance threshold.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
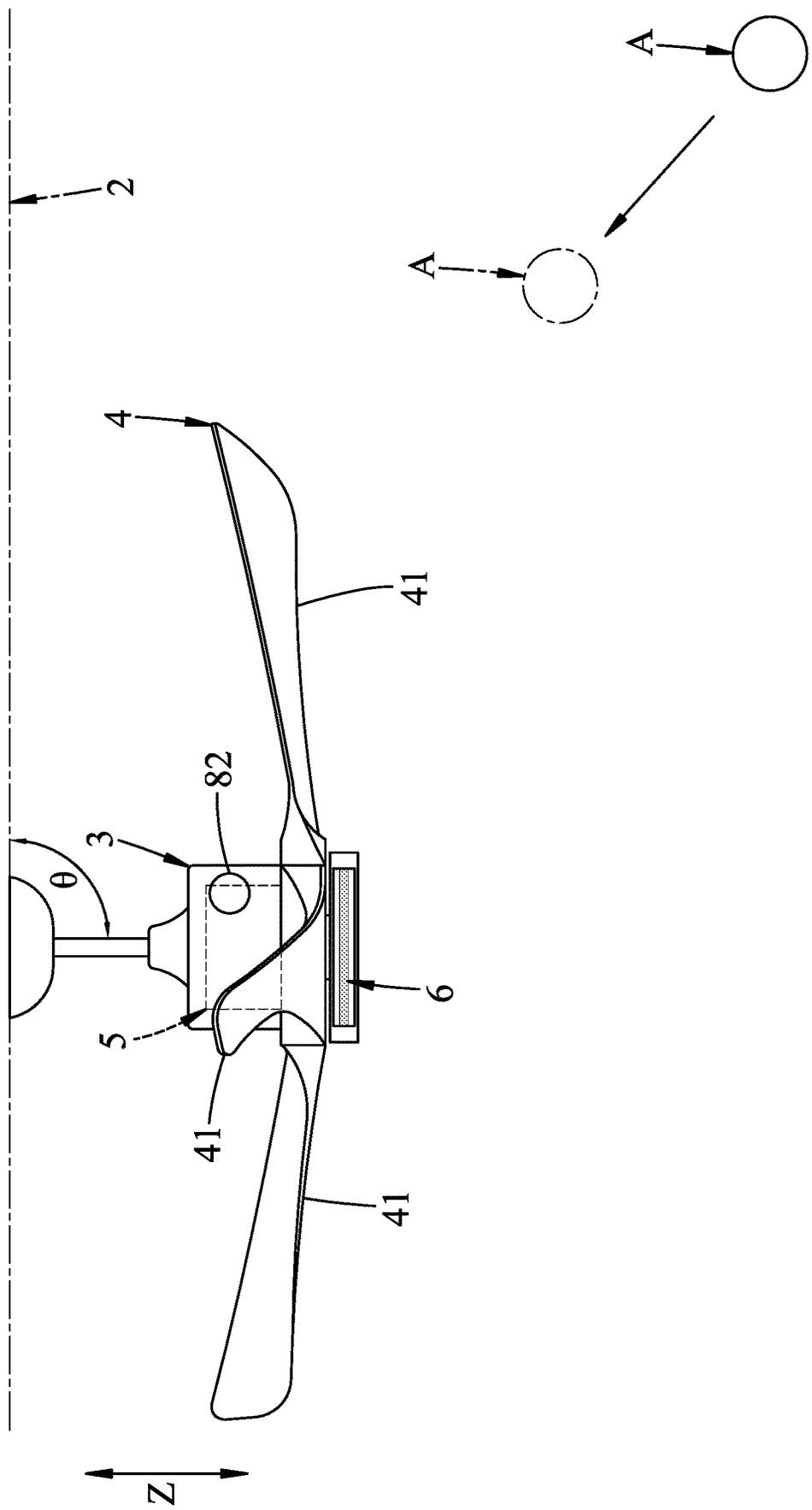
FIG. 1 is a front view of a ceiling fan according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
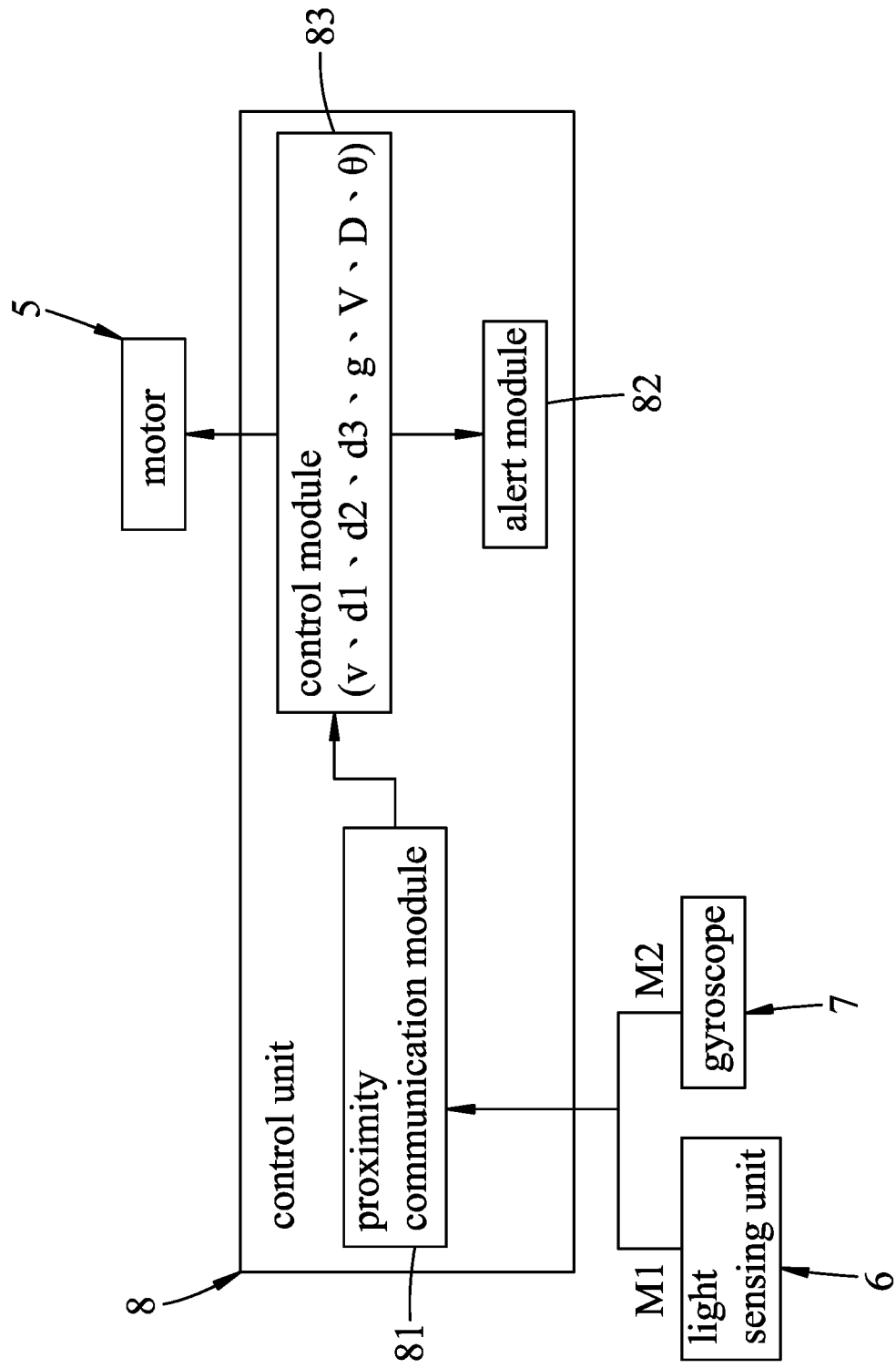
FIG. 2 is a block diagram illustrating the ceiling fan according to an embodiment of the disclosure.

Referring to FIGS. 1 and 2, a ceiling fan according to an embodiment of the disclosure is adapted to be hung from an installation surface 2 (e.g., a ceiling) in a vertical direction (Z). The ceiling fan includes a carrier unit 3, a motor 5, a fan body 4, a light sensing unit 6, a gyroscope 7, and a control unit 8. The carrier unit 3 is adapted to be connected to the installation surface 2. The fan body 4 is disposed to be driven by the motor 5 to rotate relative to the carrier unit 3, and includes four fan blades 41 in this embodiment. The motor 5 is mounted to the carrier unit 3, and is configured to drive the fan body 4 to rotate with electric power. The light sensing unit 6 is mounted to the carrier unit 3, and is configured to emit a light signal, to receive the light signal reflected by objects (e.g., an object (A) in FIG. 1) within a detection range of the light sensing unit 6, and to output a first signal (M1) that is related to a round trip time of the light signal. The light sensing unit 6 may include, for example, a light detection and ranging (LIDAR) device. Since the light sensing unit 6 is not the emphasis of this disclosure and is well-known to one having ordinary skill in the art, it will not be described in further detail for the sake of brevity.

The gyroscope 7 is mounted to the carrier unit 3, and is configured to output a second signal (M2) that is related to an angular momentum. Since the gyroscope 7 is not the emphasis of this disclosure and is well-known to one having ordinary skill in the art, it will not be described in further detail for the sake of brevity.

The control unit 8 is mounted to the carrier unit 3, and includes an alert module 82, a control module 83, and a proximity communication module 81 that is configured to receive the first signal (M1) and the second signal (M2).

In this embodiment, the proximity communication module 81 is electrically connected to the light sensing unit 6 and the gyroscope 7. The proximity communication module 81 may use short-range wireless technologies such as Bluetooth, wireless fidelity (Wi-Fi), or near field communication (NFC) for communicating with the control module 83. In some embodiments, the control module 83 may be directly connected to the light sensing unit 6 and the gyroscope 7 through, for example, wired connection for receiving the first signal (M1) and the second signal (M2), and this disclosure is not limited in this respect.

The alert module 82 is configured to generate a warning signal that is provided in the form of either a light or a sound. The alert module 82 may be realized by, for example, a buzzer, a light-emitting diode (LED), and so on.

In this embodiment, the control module 83 is electrically connected to the motor 5, the proximity communication module 81, and the alert module 82, and is communicatively connected to the light sensing unit 6 and the gyroscope 7 through the proximity communication module 81.

The control module 83 is configured to, for each object (exemplified as the object (A) hereinafter) within the detection range of the light sensing unit 6, calculate a distance (D) between the object (A) and the ceiling fan based on the first signal (M1) outputted by the light sensing unit 6, a speed (V) of the object (A) (referred to as an object speed hereinafter) relative to the ceiling fan based on change in the distance (D) over time, and an angle (θ) between the ceiling fan and the installation surface 2 based on the second signal (M2) outputted by the gyroscope 7. In this embodiment, the control module 83 is configured to calculate the distance (D) using a time-of-flight principle. The control module 83 may be implemented by a central processing unit (CPU), a microcontroller (MCU), or any circuit capable of implementing functionalities of this disclosure.

The control module 83 is pre-stored with a speed threshold (v), a first distance threshold (d1), a second distance threshold (d2), a third distance threshold (d3), and an angle threshold (g). The second distance threshold (d2) is smaller than the first distance threshold (d1), and the third distance threshold (d3) is not smaller than the first distance threshold (d1).

In accordance with some embodiments, the speed threshold (v) is between 8 km/h and 12 km/h, the first distance threshold (d1) is between 0.8 m and 1.2 m, the second distance threshold (d2) is between 20 cm and 30 cm, and the angle threshold (g) is between 10° and 60°. In this embodiment, the speed threshold (v) is 10 km/h, the first distance threshold (d1) is 1.0 m, the second distance threshold (d2) is 25 cm, and the angle threshold (g) is 45°, but the exact numbers are not limited to the abovementioned examples.

In this embodiment, the third distance threshold (d3) is 1.5 m. It should be noted that the third distance threshold (d3) is not limited to being greater than the first distance threshold (d1). In some embodiments, the third distance threshold (d3) is identical to the first distance threshold (d1).

Figure 3:
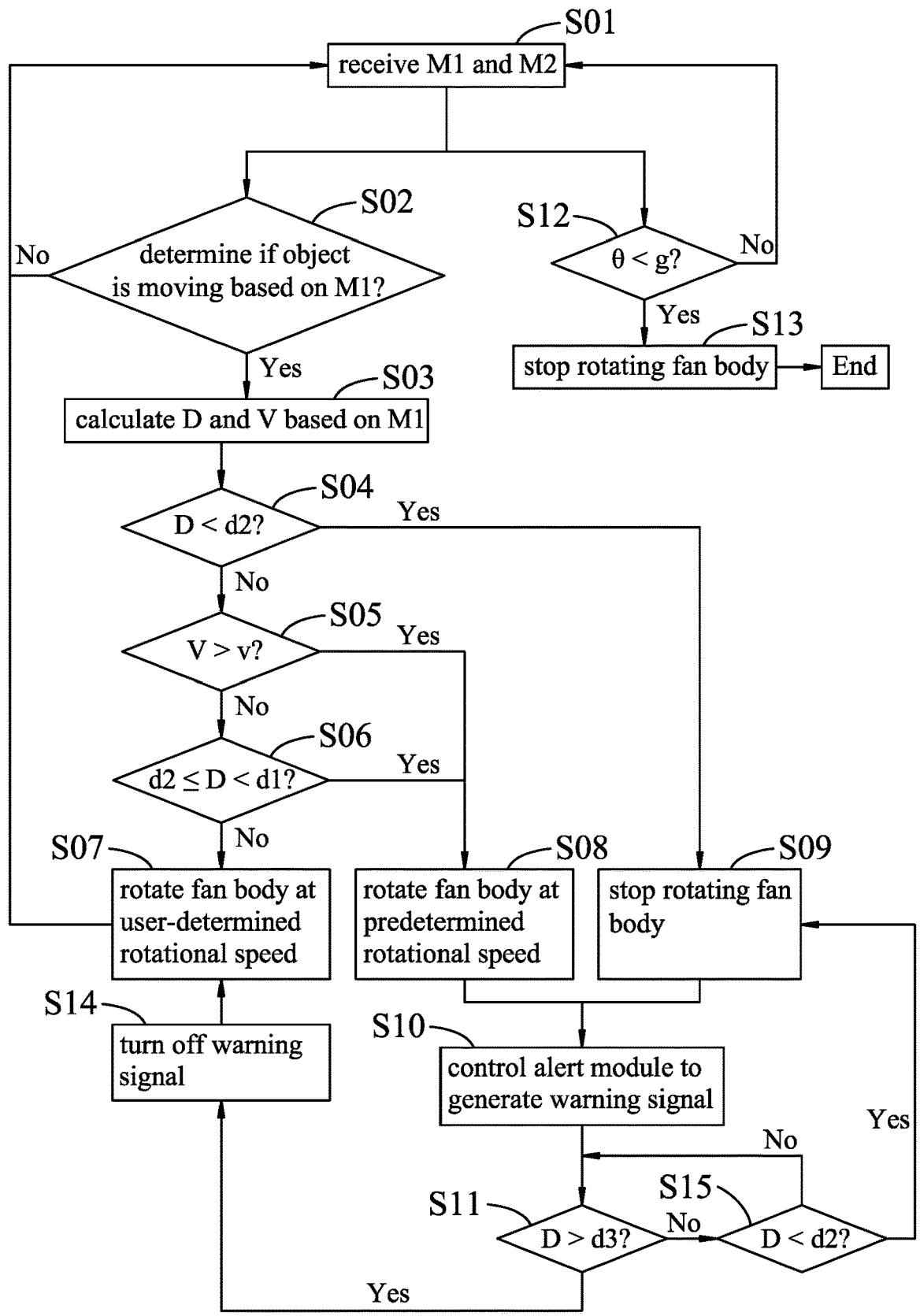
FIG. 3 is a flow chart illustrating a safety procedure of the ceiling fan according to an embodiment of the disclosure.

Further referring to FIG. 3, a safety procedure of the ceiling fan is illustrated. Usually, a rotational speed of the fan body 4 is approximately between 150 revolutions per minute (rpm) and 370 rpm. A user-defined rotational speed is set to, for example, 250 rpm. The safety procedure is performed by the control module 83 and includes steps S01-S15.

In step S01, the control module 83 receives the first signal (M1) and the second signal (M2) via the proximity communication module 81.

In step S02, after receiving the first signal (M1) and the second signal (M2), the control module 83 determines whether an object (e.g., exemplified as the object (A) in the illustrated embodiment) is moving within a detection range of the light sensing unit 6 based on the first signal (M1). If affirmative, the flow proceeds to step S03; otherwise, the flow goes back to step S01.

In step S03, the control module 83 calculates the distance (D) between the object (A) and the ceiling fan based on the first signal (M1), and calculates the object speed (V) of the object (A) relative to the ceiling fan based on change in the distance (D) over time, and the flow proceeds to step S04.

In step S04, the control module 83 determines whether the distance (D) is smaller than the second distance threshold (d2). If affirmative, the flow proceeds to step S09; otherwise, the flow proceeds to step S05.

In step S05, the control module 83 determines whether the object speed (V) is greater than the speed threshold (v). If affirmative, the flow proceeds to step S08; otherwise, the flow proceeds to step S06.

In step S06, the control module 83 determines whether the distance (D) is between the first distance threshold (d1) and the second distance threshold (d2) (e.g., d2≤D<d1). If affirmative, the flow proceeds to step S08; otherwise the flow proceeds to step S07.

It should be noted that, in some embodiments, the order of performing the steps S04-S06 may vary and is not limited to the abovementioned example.

In step S07, the control module 83 controls the motor 5 to drive the fan body 4 to rotate at the user-defined rotational speed (i.e., rotating at 250 rpm in this example), and the flow goes back to step S01.

In step S08, the control module 83 controls the motor 5 to drive the fan body 4 to rotate at a predetermined rotational speed that is smaller than the user-defined rotational speed, and the flow proceeds to step S10. In accordance with some embodiments, the predetermined rotational speed is between 10 rpm and 150 rpm. In this embodiment, the predetermined rotational speed is set to 50 rpm.

In step S09, the control module 83 controls the motor 5 to stop rotating the fan body 4, and the flow proceeds to step S10.

In step S10, the control module 83 controls the alert module 82 to generate the warning signal that is one of a first warning type, a second warning type, and a third warning type that respectively corresponds to step S05, step S06, and step S04/S15 if being determined to be affirmative.

In other words, the first warning type means that the object speed (V) is greater than the speed threshold (v), the second warning type means that the distance (D) is between the first distance threshold (d1) and the second distance threshold (d2), and the third warning type means that the distance (D) is smaller than the second distance threshold (d2). It should be noted that the first warning type, the second warning type, and the third warning type may be identical to or different from each other.

In step S11, the control module 83 determines whether the distance (D) is greater than the third distance threshold (d3). If affirmative, the flow proceeds to step S14; otherwise, the flow proceeds to step S15.

In step S12, after receiving the first signal (M1) and the second signal (M2), the control module 83 calculates an angle (θ) that is between the ceiling fan and the installation surface 2 based on the second signal (M2), and then determines whether the angle (θ) is smaller than the angle threshold (g). If affirmative, the flow proceeds to step S13; otherwise, the flow goes back to step 301.

In step S13, the control module 83 controls the motor 5 to stop rotating the fan body 4, and the flow of the safety procedure is terminated.

In step S14, the control module 83 controls the alert module 82 to turn off the warning signal that is generated in step S10, and the flow goes back to step S07.

In step S15, the control module 83 determines whether the distance (D) is smaller than the second distance threshold (d2). If affirmative, the flow proceeds to step S09; otherwise, step S11 is repeated.

In the safety procedure, when the object speed (V) of the object (A) is relatively great (i.e., greater than the speed threshold (v)), or when the object (A) is not excessively close to the ceiling fan (i.e., the distance (D) is between the second distance threshold (d2) and the first distance threshold (d1)), the control module 83 controls the motor 5 to decrease the rotational speed of the fan body 4 as a precaution against danger while keeping the fan body 4 to rotate for air circulation.

When the object (A) suddenly approaches the ceiling fan, thereby shortening the distance (D) between the object (A) and the ceiling fan (i.e., the distance (D) becomes smaller than the second distance threshold (d2)), since the rotational speed of the fan body 4 has already been decreased when the distance (D) is smaller than the first distance threshold (d1), the control module 83 may control the motor 5 to stop rotating the fan body 4 in a short period of time, thus minimizing any danger that may occur.

Furthermore, by virtue of detecting the angle (θ) between the ceiling fan and the installation surface 2, the control module 83 may control the motor 5 to stop rotating the fan body 4 when the angle (θ) becomes smaller than the angle threshold (g) (e.g., when an earthquake happens and makes the ceiling fan shake violently), thus providing protection to users.

Figure 4:
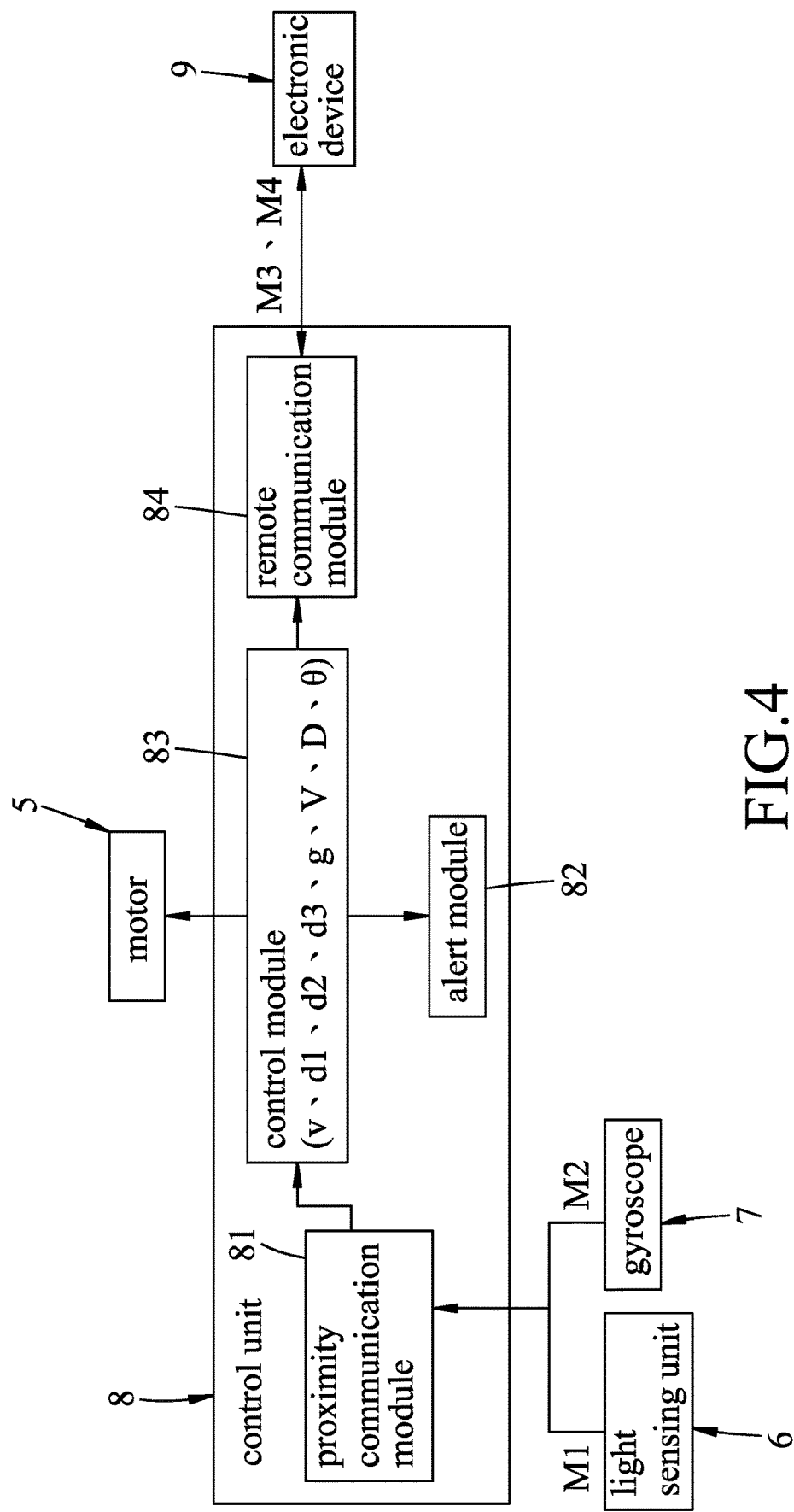
FIG. 4 is a block diagram illustrating the ceiling fan according to another embodiment of the disclosure.

Further referring to FIG. 4, in some embodiments, the control unit 8 further includes a remote communication module 84 (e.g., a Bluetooth module or a Wi-Fi module) that is configured to communicate with an electronic device 9 (e.g., a mobile phone). The control unit 8 is configured to send a monitor message (M3) that is related to the distance (D) and the object speed (V) to the electronic device 9 via the remote communication module 84.

The control unit 8 may be further configured to send an alert message (M4) to the electronic device 9 when the object speed (V) is greater than the speed threshold (v), when the distance (D) is between the first distance threshold (d1) and the second distance threshold (d2), or when the distance (D) is smaller than the second distance threshold (d2). The alert message (M4) may be a first alert message, a second alert message, or a third alert message, where the first alert message corresponds to the object speed (V) being greater than the speed threshold (v) (e.g., being sent when the object speed (V) is greater than the speed threshold (v), and/or indicating such a condition), the second alert message corresponds to the distance (D) being between the first distance threshold (d1) and the second distance threshold (d2) (e.g., being sent when the distance (D) is between the first distance threshold (d1) and the second distance threshold (d2), and/or indicating such a condition), and the third alert message corresponds to the distance (D) being smaller than the second distance threshold (d2) (e.g., being sent when the distance (D) is smaller than the second distance threshold (d2), and/or indicating such a condition). It should be noted that the first alert message, the second alert message, and the third alert message may be identical to or different from each other.

In summary, the ceiling fan according to the embodiment of the disclosure is configured to change the rotational speed of the fan body 4 by determining the object speed (V) of the object (A) and the distance (D) between the object (A) and the ceiling fan. The ceiling fan is configured to decrease the rotational speed of the fan body 4 from the user-determined rotational speed to the predetermined rotational speed when the object speed (V) is greater than the speed threshold (v) or when the distance is between the first distance threshold (d1) and the second distance threshold (d2), and to completely stop rotation of the fan body 4 only when the distance (D) is smaller than the second distance threshold (d2), thus reducing actions that need to be taken when turning off the fan body 4 as some of these actions may be unnecessary when the object (A) is not very close to the ceiling fan. The ceiling fan is further configured to return the rotational speed of the fan body 4 to the user-determined rotational speed from the predetermined rotational speed when the object (A) that was originally close to the ceiling fan (i.e., a distance from the ceiling fan is smaller than the first distance threshold (D1)) has moved away from the ceiling fan to be farther than the third distance threshold (d3), thereby making the ceiling fan more convenient to use.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A ceiling fan configured to hang from an installation surface, comprising:
   a carrier unit adapted to be connected to the installation surface;
   a motor mounted to said carrier unit;
   a fan body disposed to be driven by said motor to rotate relative to said carrier unit;
   a light sensing unit mounted to said carrier unit, and configured to emit a light signal, to receive the light signal reflected by an object, and to output a first signal that is related to a round trip time of the light signal; and
   a control unit being electrically connected to said motor and said light sensing unit, and being configured to perform a safety procedure when said fan body is rotating at a user-defined rotational speed;
   wherein said control unit is configured to, in the safety procedure,
   calculate, using a time-of-flight principle, a distance between the object and said ceiling fan based on the first signal outputted by said light sensing unit, and an object speed of the object relative to said ceiling fan based on a change in the distance over time,
   control said motor to rotate said fan body at a predetermined rotational speed when the distance is between a first distance threshold and a second distance threshold that is smaller than the first distance threshold, wherein an value of the predetermined rotational speed is smaller than the user-defined rotational speed, control said motor to stop rotating said fan body when the distance is smaller than the second distance threshold, and control said motor to rotate said fan body at the predetermined rotational speed when the object speed is greater than a speed threshold and when the distance is not smaller than the second distance threshold.

2. The ceiling fan as claimed in claim 1, wherein said control unit further includes a remote communication module that is configured to communicate with an electronic device, and said control unit is configured to send a monitor message that is related to the distance and the object speed to the electronic device; and send a warning message to the electronic device, wherein, the warning message is one of a first alert message that is related to when the object speed is greater than the speed threshold, a second alert message that is related to when the distance is between the first distance threshold and the second distance threshold, and a third alert message that is related to when the distance is smaller than the second distance threshold.

3. The ceiling fan as claimed in claim 2, wherein said control unit further includes an alert module, and said control unit is configured to control said alert module to generate a warning signal, wherein, the warning signal is one of a first warning that is related to when the object speed is greater than the speed threshold, a second warning that is related to when the distance is between the first distance threshold and the second distance threshold, and a third warning that is related to when the distance is smaller than the second distance threshold.

4. The ceiling fan as claimed in claim 3, wherein the warning signal is provided in a form of one of a light and a sound.

5. The ceiling fan as claimed in claim 1, wherein said control unit is further configured to, after controlling said motor to stop rotating said fan body in the safety procedure, control said motor to rotate said fan body when the distance is greater than a third distance threshold that is not smaller than the first distance threshold.

6. The ceiling fan as claimed in claim 5, wherein said control unit is configured to, after controlling said motor to stop rotating said fan body in the safety procedure, control said motor to rotate said fan body at the user-defined rotational speed when the distance is greater than the third distance threshold.

7. The ceiling fan as claimed in claim 1, wherein said control unit is further configured to, after controlling said motor to rotate said fan body at the predetermined rotational speed in the safety procedure, control said motor to rotate said fan body at the user-defined rotational speed when the distance is greater than a third distance threshold that is not smaller than the first distance threshold.

8. The ceiling fan as claimed in claim 1, wherein said control unit is further configured to, after controlling said motor to rotate said fan body at the predetermined rotational speed in the safety procedure, control said motor to stop rotating said fan body when the distance is smaller than the second distance threshold.

9. The ceiling fan as claimed in claim 1, further comprising a gyroscope being electrically connected to said control unit, being mounted to said carrier unit, and being configured to output a second signal that is related to an angular momentum, wherein said control unit is configured to calculate an angle between the ceiling fan and the installation surface based on the second signal outputted by said gyroscope, and control said motor to stop rotating said fan body when the angle is smaller than an angle threshold.

* * * * *